Dec. 27, 1932.  H. W. FINK  1,892,506
DEFLECTOR FOR AUTOMOBILE HEATERS
Filed Jan. 30, 1930   3 Sheets-Sheet 3

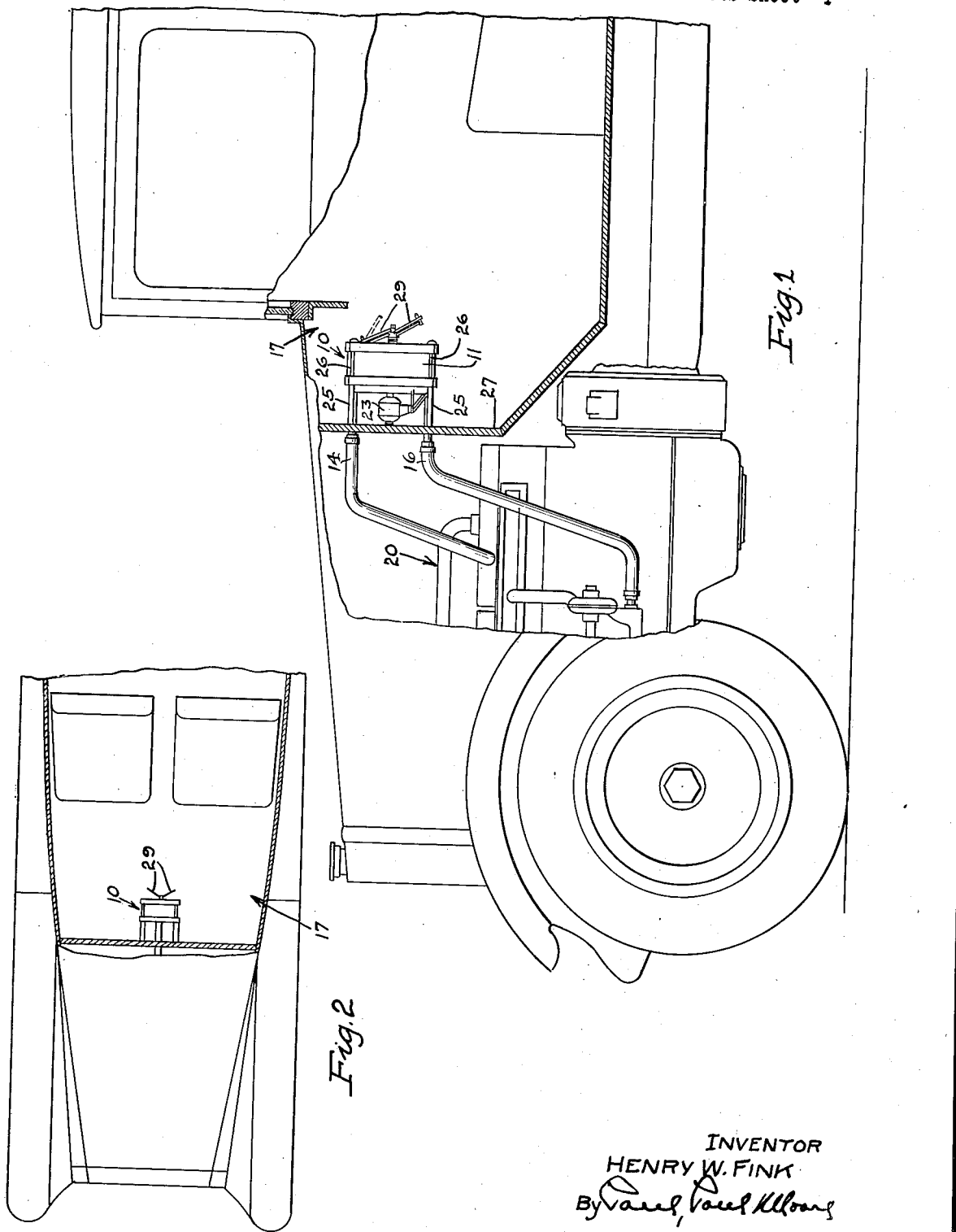

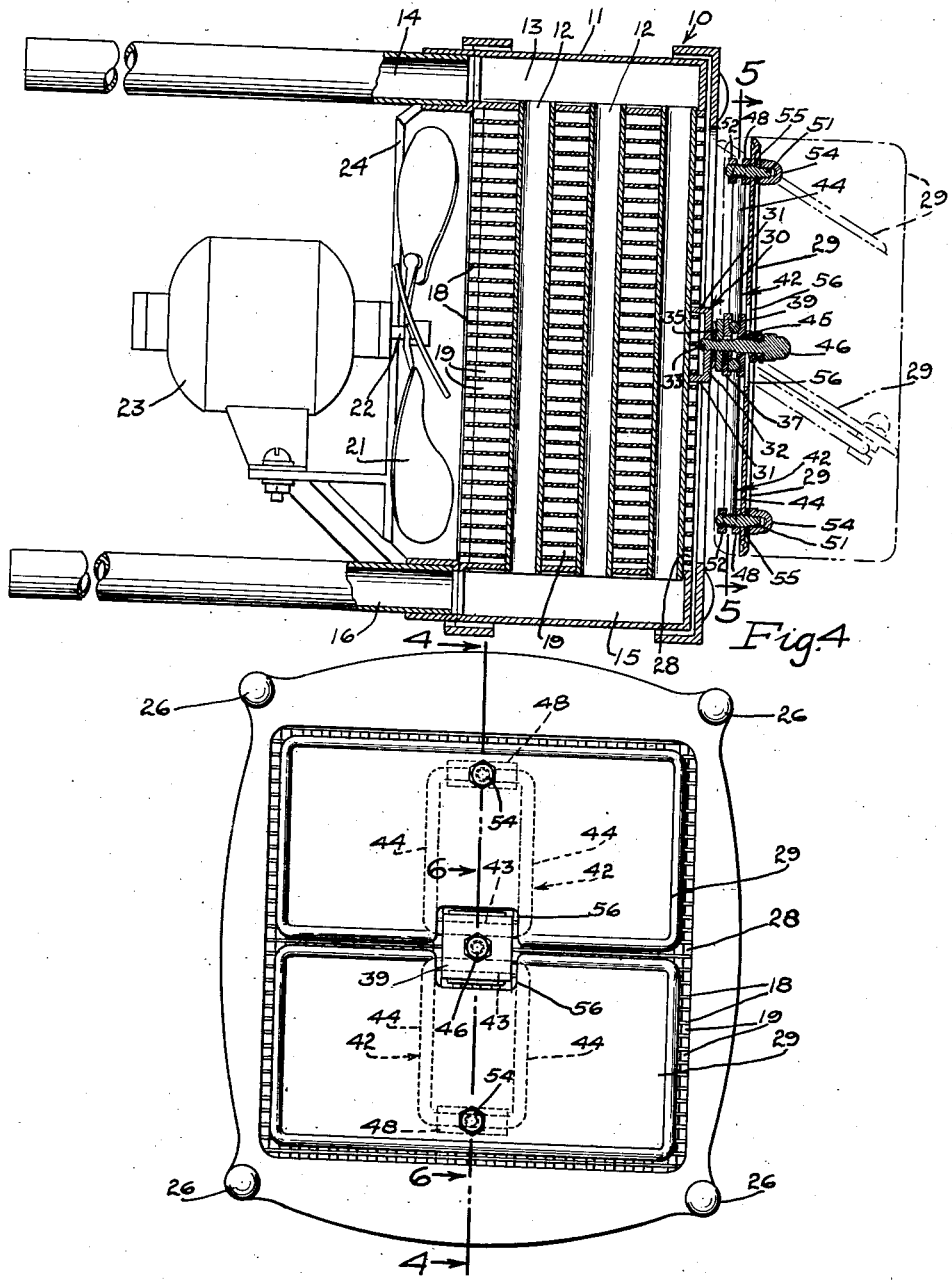

INVENTOR
HENRY W. FINK
ATTORNEYS

Patented Dec. 27, 1932

1,892,506

UNITED STATES PATENT OFFICE

HENRY W. FINK, OF MINNEAPOLIS, MINNESOTA, ASSIGNOR TO TROPIC-AIRE, INCORPORATED, OF MINNEAPOLIS, MINNESOTA, A CORPORATION OF DELAWARE

DEFLECTOR FOR AUTOMOBILE HEATERS

Application filed January 30, 1930. Serial No. 424,572.

An object of the invention is to provide an automotive vehicle heater which will present certain improvements over the disclosure of the pending application of C. H. Will, Serial No. 413,278, filed December 11, 1929, now Patent No. 1,859,418, granted May 24, 1932.

A further object is to provide an automotive vehicle heater, adapted to be situated interiorly of the vehicle body, having a heat deflector adjustably associated with said heater and capable of being positioned at will to direct warm air emanating from the heater toward any preferred part of the interior of the vehicle body, as, for example, toward or away from the driver or other occupant of the vehicle.

A still further object is to provide an adjustable heat deflector which will also serve as a heat regulator adapted to control the passage of warm air from the heater to the vehicle body interior.

Other objects and advantages of the invention will become apparent as the full description thereof proceeds, it being understood that the disclosure herein is merely illustrative and that the invention is not limited to the exact structure set forth, various changes being permissible within the scope of the claims which follow.

In the accompanying drawings forming a part of this specification,

Fig. 1 is a view in side elevation of an apparatus having the features of the invention, disclosing a manner of associating the apparatus with an automotive vehicle and its water-circulating cooling system;

Fig. 2 is a top plan view of the apparatus of Fig. 1, on a smaller scale, a part of the automotive vehicle also being shown;

Fig. 3 is a front elevational view of the heating element and regulator and deflector of Figs. 1 and 2;

Fig. 4 is an enlarged central sectional view, taken on line 4—4 in Fig. 3, of the heating element with heat regulator and deflector;

Figure 5:
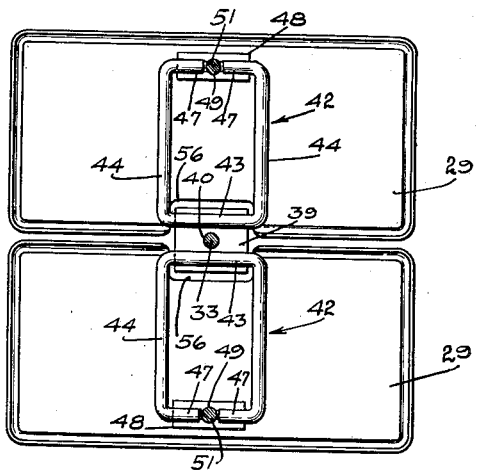
Fig. 5 is a sectional view taken as on line 5—5 in Fig. 4.

With respect to the drawings, numeral 10 represents, generally, a heating element having the features of the invention and including a casing 11 housing water-circulating tubes 12 each opening at one end to a chamber 13 in which a fluid conducting member 14 is arranged, and each opening at its opposite end to a chamber 15 in which a fluid conducting member 16 is arranged. The manner in which the water-circulating tubes 12 are associated with the chambers 13 and 15 is very clearly disclosed in Fig. 4.

The heating element 10 will be mounted within an automotive vehicle body, such as presented at 17, desirably as disclosed in Figs. 1 and 2, although the heating element could be otherwise mounted in the vehicle body.

Numeral 18 represents spaced apart plates extending transversely of the water-circulating tubes 12 and having perforations through which said water-circulating tubes pass. Side portions of the casing 11 are adjacent to or contiguous with the ends of the spaced apart plates 18 to provide air passages 19 between the plates and about the tubes 12 and within the confines of the four walls of the casing 11.

The fluid conducting member 16 leads to the water-circulating cooling system 20 of the automotive vehicle, and the fluid conducting member 14 leads from said water-circulating cooling system to the heating element, so that hot water can be caused to pass through the chamber 13, the water-circulating tubes 12, and the chamber 15, to cause air made to travel through the air passages 19 to be heated. The passage of water through the heating element as described could of course be reversed. When the heating element is mounted adjacent the dash of an automotive vehicle, as it is disclosed, the fluid conducting members 14 and 16 may pass through the dash.

The heating element as disclosed includes a fan 21 adjacent an end of the air passages 19 adapted to the purpose of causing air to be forcibly circulated through said air passages to absorb heat from the water in the water-circulating tubes 12, to thus be heated and to in turn heat the interior of the vehicle body. The fan is supported upon the shaft 22 of a motor 23 itself supported upon a shroud 24 attached to or held against the heating element casing 11 in any suitable manner, as by sleeves 25 upon tie-bolts 26 which, as shown, support the heating element upon a board, such as a dash board, 27. The tie-bolts 26 pass through flanged frames upon the heating element casing, one of said flanged frames including the shroud 24, and the sleeves 25 are situated between the dash board 27 and the adjacent flanged frame to fixedly space this frame away from the dash board and to hold it against the heating element casing. The flanged frame opposite the dash board is held to the heating element casing by heads upon the tie-bolts 26. See Figs. 1 and 3.

The particular water-circulating system utilized is immaterial so far as the present invention is concerned, the one illustrated being satisfactory. The motor 23 with the fan 21 may be supported upon the heating element in some other convenient manner. The fan forces air through the passages 19, heated by hot water circulating through the chamber 13, the water-circulating tubes 12, and the chamber 15, and thus warms the air in the vehicle body and keeps the warm air in continuous circulation.

A specific purpose of the present invention is to provide a deflector for the heated air forced through the air passages 19, and which will serve as a heat regulating means controlling the passage of heated air through the heating element and into the vehicle body interior. The deflector and regulator is adjustable, is desirably removable, and is capable of being associated with any heating element having the general characteristics as illustrated and as hereinbefore briefly outlined.

Referring more particularly to Fig. 3, it will be seen that the open portion 28 of the casing 11 is there disclosed as practically square. Numeral 29 designates each of a pair of oblong deflector plates having length a trifle less than one dimension of the square open portion 28, and having width slightly less than one-half of said dimension of the square open portion. Each deflector plate could be of greater or less dimension than stated.

Figure 7:
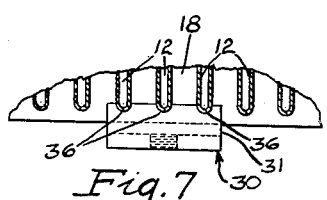
Fig. 7 is a detail view disclosing a manner of associating the stud plate with the heating element.
Figure 8:
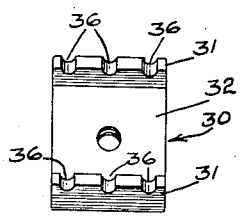
Fig. 8 is a perspective view of the stud plate, removed from the heating element.
Figure 6:
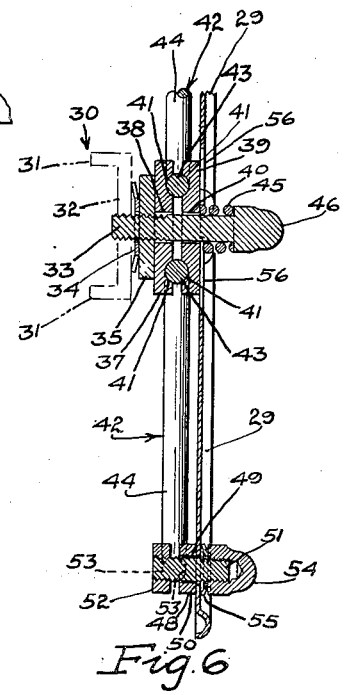
Fig. 6 is an enlarged sectional view taken on line 6—6 in Fig. 3.

Numeral 30 represents a stud plate suitably secured, as by welding or soldering, to the ends of certain of the plates 18, opposite the fan 21, desirably centrally of the open portion 28 of the front face of the casing 11. As shown, the stud plate 30 is of channel shape, the arms 31 thereof being positioned between certain of the plates 18 and secured thereto, and the body 32 of the stud plate being arranged adjacent the forward face of the heating element, parallel with said forward face. The inner edges of the arms 31 are notched as at 36 to fit the water-circulating tubes 12. See Figs. 7 and 8.

A threaded opening in the body 32 of the stud plate 30 removably receives a screw bolt 33, and the screw bolt is locked in the stud plate by means of a lock washer 34 and a lock nut 35 upon the screw bolt and next adjacent to the stud plate. A flat plate 37 next adjacent the lock nut has an opening 38 which freely receives the screw bolt 33. A similar flat plate 39 upon the screw bolt has an opening 40 freely receiving said screw bolt. The plates 37 and 39 are spaced apart, and said plates include two sets of complemental grooves 41, including a set of grooves at each of the opposite sides of the screw bolt. Numeral 42 represents each of a pair of generally U-shaped members or wires, each including a base 43 adapted to rest in complemental grooves 41, and legs 44 which extend perpendicularly away from the grooves 41 and lie adjacent the opposite edges of the plates 37 and 39. A coil spring 45 upon the screw bolt 33 and between the head 46 of the screw bolt and the plate 39 urges said plate 39 toward the plate 37, which is held against movement by the lock nut 35, to yieldably retain the bases 43 of the members or wires 42 in the different sets of complemental grooves 41.

The legs 44 of each of the U-shaped members or wires 42 include inwardly projecting and alining extensions 47 which pivotally support outer portions of the deflector plates 29 in the manner as now to be described. A flat plate 48 suitably secured to the inner face of each deflector plate 29 adjacent the outer margin of the deflector plate and desirably at the midlength thereof, includes an opening 49, alining with an opening 50 in the deflector plate, the said openings 49 and 50 being adapted to freely receive a threaded member 51 including a desirably elongated head 52 adapted to lie at the inner side of the plate 48 in spaced relation thereto. Each plate 48 and the corresponding elongated head 52 include complemental sets of grooves 53 at opposite sides of the threaded member 51 in which the extensions 47 of the legs 44 of each U-shaped member or wire are adapted to lie. A nut 54 adjustable upon the outer end of each threaded member 51 engages a spring washer 55 upon the threaded member and between the nut and adjacent face of the deflector plate to resiliently hold each plate 48 and the corresponding elongated head 52 in resilient engagement with the extensions 47, to thus yieldably retain said extensions in the grooves 53.

Each deflector plate 29 is desirably rectangular and is constructed to be ornamental. As shown, each deflector plate has a plain body and rolled marginal portions. The inner portion of each deflector plate is provided with a central cut-out 56 to freely clear the plate 39.

It will be evident that the plates 37 and 39 can be rotated upon the screw bolt 33, so that the whole unit including the deflector plates will move about said screw bolt 33 as an axis. It will likewise be evident that each U-shaped member or wire 42 can be independently rotated upon the axis for its base 43, in direction toward and away from the heating element, in such manner that each deflector plate will move as a unit with its corresponding U-shaped member or wire. And it will also be evident that each deflector plate 29 can be swung upon the extensions 47 of the corresponding U-shaped member or wire toward and away from the legs 44 thereof. The coil spring 45 provides sufficient spring tension to cause the deflector plates to remain, against the possibility of accidental displacement, at any axial position to which set upon the screw bolt 33, and said coil spring 45 affords a yielding pressure engagement between the plates 37, 39 and the bases 43 of the U-shaped members or wires 42 to insure that said U-shaped members or wires will remain, against the probability of accidental displacement, at any position to which adjusted upon the bearings for said bases 43 as axes. Likewise, each spring washer 55 affords yielding pressure engagement between a plate 48 and the corresponding elongated head 52 and the extensions 47 to insure that the deflector plates will remain, against the probability of accidental displacement, at any position to which adjusted upon said extensions 47 as axes. Evidently, the tension of the coil spring 45 can be altered by adjustment of the screw bolt 33 in the body of the stud plate 30, and the tension of each spring washer 55 can be altered by adjustment of the corresponding nut 54 upon a threaded member 51.

The manner in which the regulator and deflector plates function will be plain from the drawings. In Fig. 3 the deflector plates are shown in approximately parallel relation to the front face of the heating element to close nearly all of the open portion 28 of said front face to thus almost completely shut off the passage of hot air from the heating element to the vehicle body interior. In Fig. 4, in dotted lines, the lower deflector plate is shown swung outwardly, together with the corresponding U-shaped member or wire, upon the axis for the base 43 of the U-shaped member or wire. In said Fig. 4, in dotted lines, the upper deflector plate is shown swung outwardly upon the corresponding extensions 47 as an axis. Also in dotted lines in Fig. 4, a deflector plate is shown turned to vertical position and swung outwardly. In Fig. 1, in full lines, the lower deflector plate is swung outwardly and the upper deflector plate is swung inwardly, each upon the axis at the inner portion of the plate. In dotted lines in Fig. 1, the upper deflector plate is swung outwardly upon its outer axis. In Fig. 2 the deflector plates are in vertical position and are swung outwardly on their inner axes. It will be obvious that the deflector plates can be placed at a great number of different positions upon any of their axes. Both deflector plates can, of course, be swung outwardly to be substantially perpendicular to the front face of the heating element to thus offer approximately no resistance to the passage of heated air to the vehicle body interior.

It will be evident that the deflector unit can be very easily assembled with and disconnected from the heating element.

While I have described the opening 28 through the heating element as square in outline, and the deflector plates 29 as oblong, it will be evident that either said opening 28 or said plates 29, or both, can be of variant shape, within the principles of the invention.

The heating element 10 could be supported adjacent a wall of a vehicle body other than the dash. For example, said heating element could be situated between the front and rear seats of the vehicle body, instead of forwardly of the front seat as it is disclosed. In any case, the heater could rest upon the floor of the vehicle body.

I claim as my invention:

1. In combination, a heating element having an open face, a heat deflector for said heating element consisting of a deflector plate situated adjacent said open face, and means for supporting said deflector plate for swinging movement about a plurality of separate axes toward and away from said open face, said deflector plate being adapted to remain, against the probability of accidental displacement, at any adjusted position to which set with respect to either of said axes.

2. In combination, a heating element having an open face, a heat deflector for said heating element consisting of a deflector plate situated adjacent said open face, means supporting said deflector plate for rotative movement in a plane approximately parallel to said open face, and means for supporting said deflector plate for swinging movement about a plurality of separate axes toward and away from said open face, said deflector plate being adapted to remain, against the probability of accidental displacement, at any adjusted position to which set with respect to any of said axes.

3. In combination, a heating element having an open face, a heat deflector for said heating element consisting of a plurality of deflector plates situated adjacent said open face, and means for supporting each deflector plate for independent movement about a plurality of separate axes toward and away from said open face, each of said deflector plates being adapted to remain, against the probability of accidental displacement, at any adjusted position to which set with respect to any of said axes.

4. In combination, a heating element having an open face, a heat deflector for said heating element consisting of a plurality of deflector plates situated adjacent said open face, means supporting said deflector plates for rotative movement as a unit in a plane approximately parallel to said open face, and means for supporting each deflector plate for independent movement about a plurality of separate axes toward and away from said open face, each of said deflector plates being adapted to remain, against the probability of accidental displacement, at any adjusted position to which set with respect to any of said axes.

5. In combination a heating element having an open face, a stud supported upon said heating element adjacent said open face, a member rotatably mounted upon said stud, a deflector plate, and a plurality of separate means supporting said deflector plate for swinging movement toward and from said member, said deflector plate being adapted to remain, against the probability of accidental displacement, at any adjusted position to which set.

6. In combination, a heating element having an open face, a stud supported upon said heating element adjacent said open face, a member rotatably mounted upon said stud, a plurality of heat deflector plates, and a plurality of separate means supporting each deflector plate for swinging movement toward and from said open face, each of said deflector plates being adapted to remain, against the probability of accidental displacement, at any adjusted position to which set relatively to said heating element.

7. In combination, a heating element having an open face, a stud supported upon said heating element adjacent said open face, a member rotatably mounted upon said stud, oppositely disposed deflector plates each having a cut-out portion at an intermediate part of its inner edge, means mounted upon said member supporting said deflector plates for swinging movement toward and from said open face, and separate means mounted upon each deflector plate for supporting it for swinging movement toward and from said open face, each of said deflector plates being adapted to remain, against the probability of accidental displacement, at any adjusted position to which set relatively to said heating element.

8. In combination, a heating element having an air passage, a deflector for covering said air passage, a member pivotally supported at its inner portion upon said heating element and at its outer portion upon an outer part of said deflector, said member and deflector being adapted to be swung as a unit toward and from said heating element, and said deflector being adapted to be swung toward and from said heating element and relatively to said member.

9. In combination, a heating element having an air passage, a deflector plate adjacent said heating element, a pivotal support for an inner portion of said deflector plate upon which the outer portion of the plate can be swung toward and from said heating element, and a pivotal support upon an outer portion of said deflector plate upon which the inner portion of said plate can be swung toward and from said heating element.

10. In combination, a heating element having an air passage, a member rotatably mounted adjacent said heating element, a deflector plate, means pivotally supporting an inner portion of said reflector plate upon said member to permit the outer portion of said plate to be swung toward and from said heating element, and means pivotally supporting an outer portion of said deflector plate to permit the inner portion of said plate to be swung toward and from said heating element.

In witness whereof, I have hereunto set my hand this 27th day of January, 1930.

HENRY W. FINK.